United States Patent

[11] 3,583,249

[72] Inventor  Milton Morse
           44 Honeck St., Englewood, N.J. 07631
[21] Appl. No. 851,812
[22] Filed   Aug. 21, 1969
[45] Patented June 8, 1971

[54] CHAIN SHIFTING MEANS FOR DERAILLEUR SPEED CHANGING DEVICES
5 Claims, 11 Drawing Figs.

[52] U.S. Cl. .................................................. 74/217
[51] Int. Cl. .................................................. F16h 9/24,
                                                   F16h 11/08
[50] Field of Search ........................................ 74/242.15,
                                                   242.13, 217 B

[56] References Cited
UNITED STATES PATENTS
2,598,557  5/1952  Juy ............................. 74/217(B)

| | | | |
|---|---|---|---|
| 3,125,894 | 3/1964 | Juy | 74/473 |
| 3,448,628 | 6/1969 | Shimano et al. | 74/217(B) |
| 3,453,899 | 7/1969 | Tarutani et al. | 74/217(B) |

Primary Examiner—Leonard H. Geron
Attorney—Charles E. Temko

ABSTRACT: Improved derailleur mechanism in which the rotatably mounted resiliently loaded cage which accommodates slack in the sprocket chain is so positioned that when laterally moved, it enables a segment of the chain being shifted to the next lower numerical ratio to be pinched between an idler sprocket on the cage and the next lower numerical ration sprocket, whereby the angular velocity of the driven sprocket accelerates the segment of the chain being shifted to facilitate the lateral shift of said segment onto the selected sprocket.

CHAIN SHIFTING MEANS FOR DERAILLEUR SPEED CHANGING DEVICES

This invention relates generally to speed-changing devices, and more specifically, it relates to a variable ratio chain and sprocket linkage between a rotating power source and a work load.

Most motors are constant speed devices. This is true of internal combustion engines as well as alternating current electric motors. The exceptions to this general rule are certain direct current electric motors, steam engines and hydraulic motors. An examination of steam engines and hydraulic motors reveals the immutable law that when such a motor is slowed by reducing the flow of steam or hydraulic fluid through the motor, the horsepower of the motor is correspondingly reduced. It becomes apparent, therefore, that the most efficient means of varying speeds is limited to the use of variable ratio gears, variable ratio chain drives or variable ratio belt drives. Variations of these basic drives are often used, but the basic principle always remains the same. The only room for improvement, therefore, is the ease with which these ratios can be varied. The bicycle industry has produced one of the best means for varying the ratio of the chain drive. The means is known as a derailleur. In the derailleur construction, a roller chain is caused to move from one sprocket with a specific number of teeth to an adjacent sprocket with either more or less teeth. When the chain moves to the adjacent sprocket, the extra length of chain is either supplied or absorbed in the derailleur mechanism. The means for absorbing the extra links comprises a rotating spring-loaded cage, and operates quite efficiently. However, the means by which the chain is presently moved from a small sprocket (relatively high numerical ratio) to the next larger sprocket (numerically lower ratio) is relatively crude and haphazard. This is accomplished by moving the pivotally mounted cage laterally with respect to the principal axis of the chain to alignment with the desired sprocket as the crank wheel is rotating. The moving chain then rubs against the teeth of the desired sprocket, and as the cage is moved further over, the chain will begin to ride up onto the teeth of the said sprocket. If the cage is moved still further over, then the chain will drop onto the proper teeth. As this occurs, the cage rotates to provide the additional length of chain required. It must be noted, however, that in each case, the derailleur cage must be moved to a point beyond the point of alignment with the chosen sprocket before the chain will first ride up and then drop onto the teeth of the larger sprocket. After each shift, it is necessary to draw the derailleur mechanism back into a position of alignment with the chosen sprocket. This "over shooting" has been accepted as a necessary part of the shifting operation of the derailleur method. The over shooting is particularly troublesome in cases where there are 10 or even 15 speeds. It should be noted that it is necessary to have a large number of speeds in order to achieve a wide enough spread or range of speeds between the lowest and the highest drive ratios. The overshooting problem has limited the usage of the derailleur to bicycles and other light load applications.

It will be apparent that shifting prior art derailleur mechanisms into a properly aligned relationship with any sprocket requires a high degree of skill on the part of the operator. Failure to align the derailleur mechanism properly will cause the chain to feed onto the chosen sprocket in an irregular fashion. Misalignment causes the chain and sprocket to function in a noisy and self-destructive manner.

It is therefore among the principal objects of the present invention to provide an improved derailleur mechanism in which the above-mentioned "over shooting" action has been substantially eliminated, thereby permitting a shift of the sprocket chain to be accomplished by merely aligning the cage with the desired sprocket.

Another object of the invention lies in the provision of an improved derailleur mechanism employing the same component parts as presently used in prior art devices, while yet incorporating the above described advantage.

Yet another object of the invention lies in the provision of an improved derailleur construction which may be readily incorporated into existing prior art devices, and with a minimum of modification.

Still another object of the invention lies in the provision of an improved derailleur mechanism in which the idler sprockets are so configured and positioned that chain is continuously fed directly from the same to the desired driven sprocket, rather than merely guided thereon, thereby substantially eliminating the possibilities of chain slippage during shifting, and permitting shifting under substantial load.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
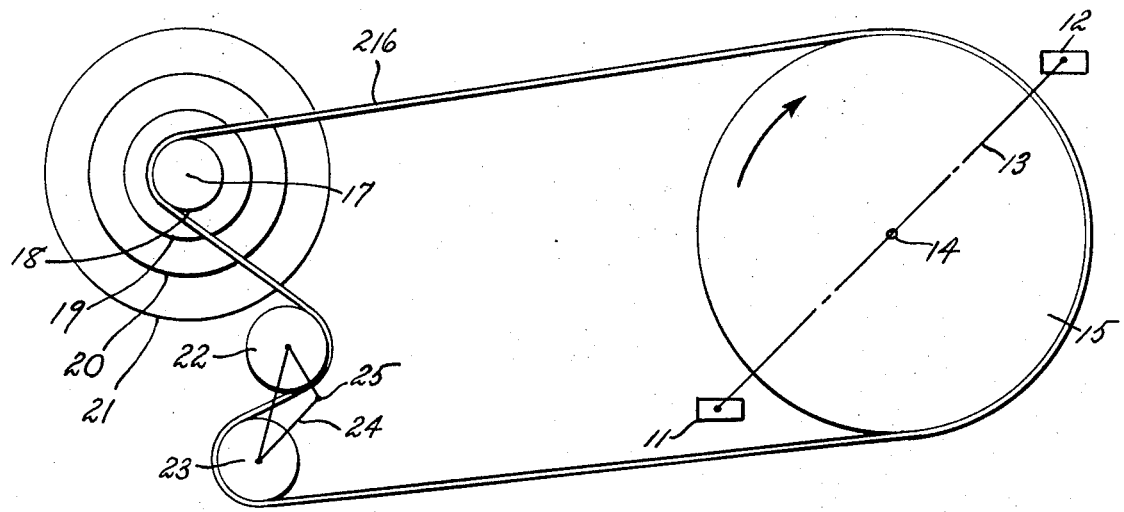
FIG. 1 is a schematic view in elevation showing a known prior art derailleur mechanism.

With reference to the drawing, FIG. 1 illustrates a conventional derailleur mechanism, of the type employed for power transmission in a bicycle (not shown). Motive power is applied to pedals 11 and 12, and is transmitted through a crank 13 having a fixed axis of rotation 14. The crank is connected to a relatively large diameter sprocket 15 rotating therewith which transmits motion through a chain 16 to a rear axle 17.

Figure 2:
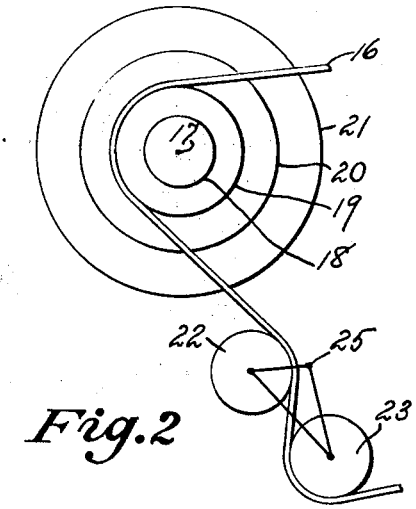
FIG. 2 is a fragmentary view corresponding to that seen in FIG. 1, but showing an altered relative position of certain of the component parts.
Figure 3:
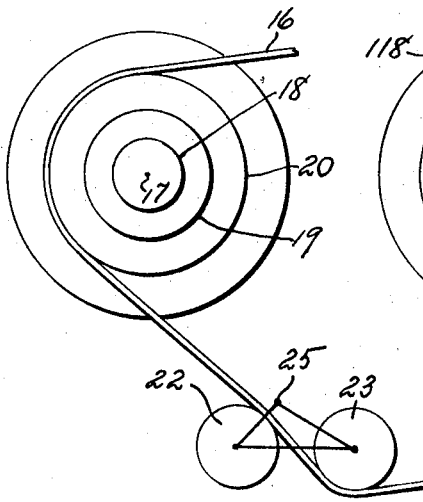
FIG. 3 is a similar fragmentary view, showing a further altered relative position of the component parts.

Coaxially mounted on the axle 17 are first, second, third and fourth sprockets, 18, 19, 20 and 21, respectively. First and second idler sprockets 22 and 23, respectively, are mounted for rotation on a triangular cage 24, the cage itself having a fixed axis of rotation 25. Resilient means (not shown) biases the cage in a clockwise direction as seen in FIG. 1 while permitting the rotation shown in FIGS. 2 and 3 to accommodate for the variable slack in the chain 16 caused by shifting the same between the sprockets 18—21. Shifting is accomplished in the manner described hereinabove, wherein the cage is moved laterally along its own axis during a period in which the chain is under relatively light tension. Initial "overshooting" must be relaxed as soon as the chain has commenced to shift, thus requiring constant attention on the part of the operator during the entire course of the shift.

Figure 4:
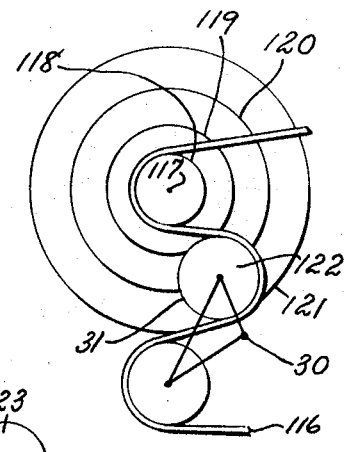
FIG. 4 is a fragmentary schematic elevational view corresponding to that seen in FIG. 1, but illustrating an embodiment of the invention.
Figure 5:
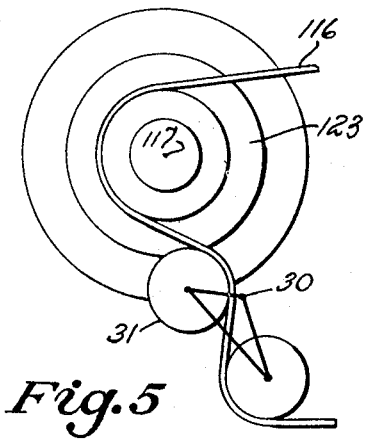
FIG. 5 is a fragmentary schematic view of the embodiment, showing a position corresponding to that seen in FIG. 2.
Figure 6:
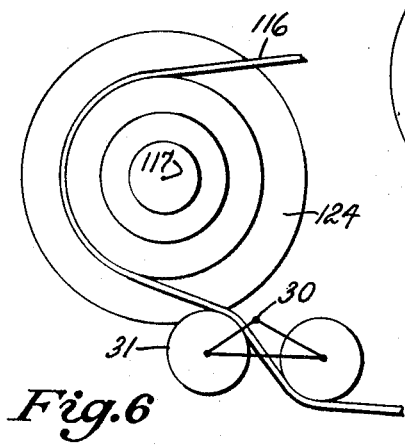
FIG. 6 is a similar fragmentary schematic view of the embodiment showing a position corresponding to that seen in FIG. 3.

Referring to Figures 4, 5 and 6, in accordance with the invention, the structure is similar to that of the prior art, and accordingly, corresponding parts have been designated by similar reference characters with the additional prefix "1". It will be observed that the pivot point 30 of the cage 124 is shifted to a position considerably closer to the axis of rotation of the axle 117, so that the periphery 31 of the idler 122 may overlie the exposed surface 32 of the gear 119. In FIGS. 5 and 6, the same periphery 31 may overlie the peripheral surfaces of the larger gears 123 and 124.

As the pitch line of the derailleur idler is brought closer to the pitch line of the sprocket to which the chain must be shifted, the amount of overshoot is reduced. When a condition as illustrated in FIGS. 4, 5 and 6 is reached, the edge of the chain is pinched between the teeth of the larger sprocket and the derailleur idler. This pinch effect causes the chain to be lifted quickly and positively onto the crest of the teeth of the larger sprocket without any overshooting, owing to the fact that with the pinching action, the angular velocity of the larger sprocket is transmitted to result in increased linear velocity of the segment of the chain being shifted with respect to the remaining portions of the chain. This increase in velocity is only momentarily, and persists long enough to permit a rapid transfer from the lower numerical sprocket to the higher.

It will be readily appreciated, that the pinching effect plays no part in the shifting of the chain from a larger to a smaller sprocket. Due to the efficiency of the pinch effect by which the chain is shifted from a smaller sprocket to a larger sprocket, the elapsed time for the shift is considerably reduced as contrasted with the prior art construction, and this, in turn, makes it possible to continue to transmit power to the sprocket assembly during the shifting operation. With the overshooting method, it is necessary to reduce the tension on the drive chain in order to allow the chain to actually overshoot beyond the point where the chain is feeding efficiently onto the newly selected sprocket. If power were to be continually applied to the chain during the overshooting cycle, then either the chain would have great difficulty in shifting, or else damage would result to the chain and the sprockets. This damaging effect becomes more apparent as the difference in the number of teeth between the sprockets increases. It is generally desirable to have a wide range of speed ratios between the motor and the work load. However, the overshooting type of derailleur becomes less efficient as the difference in the number of teeth between adjacent sprockets increases. By contrast, when the pinch effect is utilized, the larger ratio changes may be used in the shifting operation.

Figure 7:
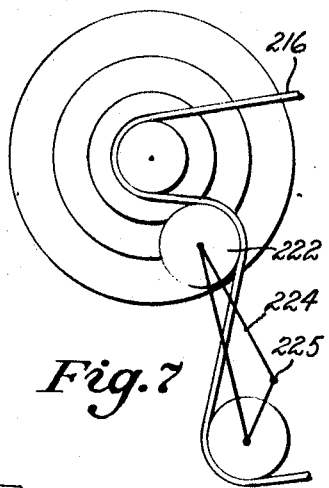
FIG. 7 is a fragmentary schematic view corresponding to that seen in FIG. 4, but showing a second embodiment of the invention.
Figure 8:
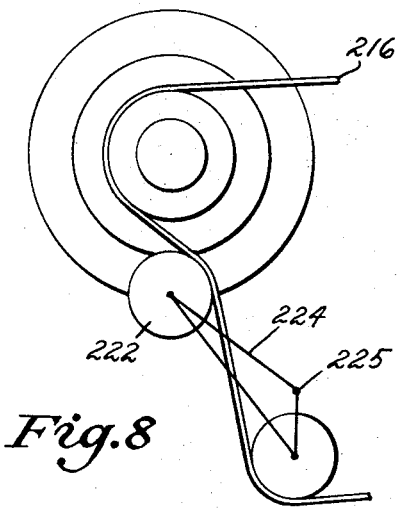
FIG. 8 is a schematic fragmentary view of the second embodiment, showing the component parts in a position corresponding to that seen in FIG. 5.
Figure 9:
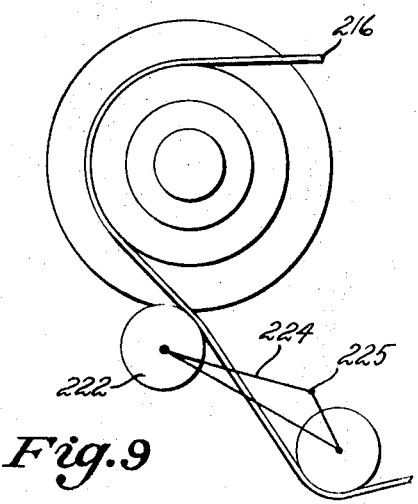
FIG. 9 is a similar fragmentary schematic view of the second embodiment showing the relative position of the component parts corresponding to that seen in FIG. 6.

Referring to the second embodiment of the invention, illustrated in FIGS. 7, 8 and 9, parts corresponding to those of the prior art construction have been designated by similar reference characters with the additional prefix "2".

The overlap of pitch lines can be achieved by lengthening the distance between the axis of rotation of the first idler sprocket 222 and the axis of rotation of the cage 224, as is done in the second embodiment, or the overlap can be accomplished by shortening the distance between the axis of cage rotation and the driven axle, as is the case in the first embodiment. The actual amount of overlap is not critical. Any amount of overlap will result in a pinch effect until a point is reached where the axis of the first idler sprocket reaches the pitch line of the next larger sprocket. Beyond this point, the first idler sprocket would actually have to change its direction of rotation. Due to the large permissable degree of overlap, it is virtually always possible to vary either the length of the cage as in the second embodiment, or the distance between the axis of cage rotation and the driven axle, as in the first embodiment, in order to obtain a suitable pinch effect for almost any combination of sprockets. It will be observed that in the case of the second embodiment, the degree of necessary rotation of the cage is considerably reduced in relation to the amount of slack accommodated with changing of sprocket ratios.

Figure 10:
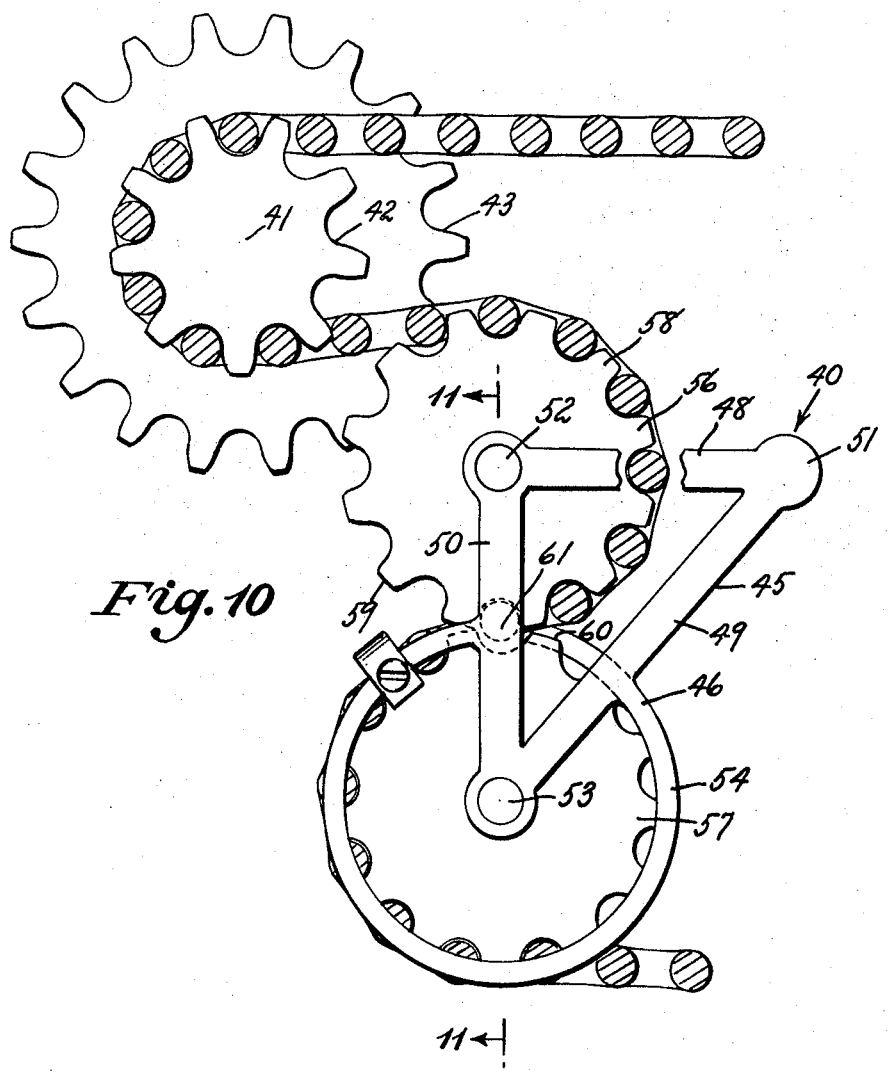
FIG. 10 is a schematic view of a third embodiment of the invention.
Figure 11:
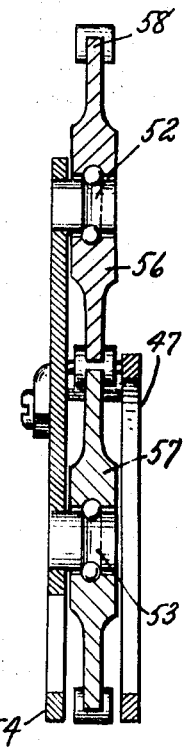
FIG. 11 is a vertical sectional view as seen from the plane 11-11 in Figure 10.

Turning now to the third embodiment of the invention, as illustrated in FIGS. 10 and 11, the device 40, is substantially modified with respect to the first two embodiments to provide improved guidance of the sprocket chain during the shifting from one sprocket to another. As seen in FIG. 10, the device includes a rear axle 41 having first and second sprockets 42 and 43, respectively. Other sprockets (not shown) may be provided in usual coaxial relation. The chain 44 is of conventional configuration.

The cage 45 includes an outer frame member 46 and an inner frame member 47. The outer frame member 46 comprises first, second and third elongated members 48, 49 and 50, respectively, interconnected at a first point 51 to form an axis for rotation of the cage, and supporting first and second parallel shafts 52 and 53 at other points of interconnection. A circularly shaped chain guide 54 is cast integrally with the members 48—50, and surrounds the shaft 53, the inner frame member 47 forming a corresponding chain guide.

Supported on the shafts 52 and 53 are idlers 56 and 57, respectively, each of which are provided with stub teeth 58 which extend only to the pitch circles 59 and 60 which are substantially mutually tangent at the point 61. Thus, while the teeth are not sufficiently long to permit the transmission of torque therethrough, at the point of tangency of the pitch circles, the chain is positively entrained upon the upper idler 56 at all times, and the likelihood of the chain slipping from the upper idler during the changing of gear ratios is reduced to a minimum. The presence of chain guides on either side of the lower sprocket assures that the chain remains properly engaged on the lower sprocket prior to arrival at the point of tangency.

I wish it to be understood that I do not consider the invention limited to the precise details of structure shown and set forth in this specification, for obvious modifications will occur to those skilled in the art to which the invention pertains.

I claim:

1. In a derailleur speed change mechanism including a driven sprocket chain, a driven shaft having a plurality of sprockets of differing numbers of teeth arranged in coaxial relation upon said driven shaft, a pivotally mounted cage having at least one idler sprocket thereon, said chain passing over said idler sprocket and selectively over one of said plurality of sprockets to drive said shaft, said cage being shiftable along its axis of rotation to move said sprocket chain to engage a selected one of said plurality of sprockets, the improvement comprising: said cage being positioned relative to said driven shaft such that pivotal movement of said cage causes said idler sprocket to describe a path of movement selectively overlying the peripheries of said plurality of sprockets, whereby movement of said cage along its own pivotal axis may cause said sprocket chain to be pinched against a juxtaposed periphery of one of said plurality of sprockets to momentarily impart the angular velocity of said last mentioned sprocket to the pinched portion of the chain to facilitate engagement thereof with said sprocket.

2. Structure in accordance with claim 1, said cage having first and second idler sprockets disposed on opposite sides of the axis of rotation of said cage.

3. Structure in accordance with claim 2, said first idler sprocket being disposed closer to said plurality of sprockets than said second idler sprocket, and having an arcuate path of travel of greater radius than that of said second idler sprocket.

4. Improved cage structure for use with a derailleur speed change mechanism comprising: a frame member, said frame member including means forming a pivotal axis and having first and second parallel shafts, first and second idler sprockets supported for rotation on said first and second shafts, respectively, each of said idler sprockets having shortened sprocket teeth which extend only to the pitch line thereof, the pitch lines of said first and second idler sprockets having pitch circles which are in substantially tangential relation.

5. Structure in accordance with claim 4, including a pair of guide plates on either side of one of said sprockets, said guide plates overlying the pitch circle of said sprocket.